United States Patent

Bruns et al.

[11] Patent Number: 5,896,932
[45] Date of Patent: Apr. 27, 1999

[54] SEED FURROW CLOSING WHEEL

[75] Inventors: Mark W. Bruns; Steven A. Bruns, both of Hutchinson, Minn.

[73] Assignee: May-Wes Manufacturing, Inc., Hutchinson, Minn.

[21] Appl. No.: 08/911,957

[22] Filed: Aug. 15, 1997

Related U.S. Application Data

[63] Continuation-in-part of application No. 29/045,706, Oct. 27, 1995, Pat. No. Des. 382,571, application No. 29/054,077, May 6, 1996, Pat. No. Des. 386,191, and application No. 29/069,044, Mar. 18, 1997, Pat. No. Des. 395,662.

[51] Int. Cl.$^6$ .................................................. A01B 21/04
[52] U.S. Cl. ......................... 172/556; 172/753; 172/772
[58] Field of Search .................................... 172/753, 762, 172/769, 766, 765, 772.5, 772, 535, 538, 556, 540; 301/64.4, 110.6, 5.3, 5.7

[56] References Cited

U.S. PATENT DOCUMENTS

| | | |
|---|---|---|
| 22,676 | 1/1859 | Seaman . |
| D. 138,712 | 9/1944 | Karl . |
| 375,741 | 1/1888 | Gilmore et al. . |
| 488,943 | 12/1892 | Dow ........................................ 172/556 X |
| 489,037 | 1/1893 | Roadhouse . |
| 874,268 | 12/1907 | Waterman ............................. 172/556 |
| 903,119 | 11/1908 | Waterman ............................. 172/556 |
| 925,926 | 6/1909 | Lindgren .......................... 172/556 X |
| 1,688,914 | 10/1928 | Ariens . |
| 1,847,327 | 3/1932 | Bateman . |
| 1,876,488 | 9/1932 | Coburn ................................. 172/556 |
| 2,070,830 | 2/1937 | Gravely ........................... 172/556 X |
| 2,140,871 | 12/1938 | Hart .................................. 172/556 X |
| 2,154,840 | 4/1939 | Gard ................................. 172/556 X |
| 2,330,308 | 9/1943 | Orendorff ............................. 172/538 |
| 2,802,408 | 8/1957 | Seaman ........................... 172/556 X |
| 2,864,298 | 12/1958 | Toland ................................. 172/556 |
| 2,888,993 | 6/1959 | Dunning ........................... 172/556 X |
| 2,909,888 | 10/1959 | Van Der Lely et al. ......... 172/556 X |
| 2,924,189 | 2/1960 | McLeod . |
| 3,170,421 | 2/1965 | Norris et al. . |
| 3,193,021 | 7/1965 | Lane ................................... 192/556 X |
| 3,266,643 | 8/1966 | Prentice ............................. 172/556 X |
| 3,435,904 | 4/1969 | Rice .................................... 172/556 |
| 3,742,877 | 7/1973 | Coffee . |
| 4,009,668 | 3/1977 | Brass et al. . |
| 4,055,126 | 10/1977 | Brown et al. . |
| 4,062,408 | 12/1977 | Enters et al. ..................... 172/556 X |
| 4,070,974 | 1/1978 | Stacy, Jr. ............................ 111/81 X |
| 4,278,036 | 7/1981 | Buchele ............................... 111/52 |
| 4,295,532 | 10/1981 | Williams et al. .................... 172/184 |
| 4,377,979 | 3/1983 | Peterson et al. ..................... 111/52 |
| 4,391,335 | 7/1983 | Birkenbach ......................... 172/540 |
| 4,425,973 | 1/1984 | Williams et al. .................... 172/574 |
| 4,522,268 | 6/1985 | Morris et al. .................... 172/538 X |
| 4,616,714 | 10/1986 | Lister ............................... 172/556 X |
| 4,785,890 | 11/1988 | Martin .................................. 172/29 |
| 5,064,001 | 11/1991 | Walker ............................ 172/762 X |
| 5,117,885 | 6/1992 | Crawford ............................ 301/64.4 |
| 5,129,282 | 7/1992 | Bassett et al. .................... 172/99 X |
| 5,224,553 | 7/1993 | Heintzman ........................... 172/556 |
| 5,316,088 | 5/1994 | Ries ..................................... 172/510 |
| 5,337,832 | 8/1994 | Bassett ................................ 172/504 |
| 5,341,754 | 8/1994 | Winterton ........................... 111/139 |
| 5,346,020 | 9/1994 | Bassett ................................ 172/540 |
| 5,398,625 | 3/1995 | Johnson et al. ..................... 111/189 |
| 5,437,336 | 8/1995 | Symonds ............................ 172/176 |

(List continued on next page.)

FOREIGN PATENT DOCUMENTS 2 122 062   1/1984   United Kingdom .................. 172/604

OTHER PUBLICATIONS

ACRA–Plant Spoke Press Wheels—Circle 50 from Progressive Farmer P/G8 Dec. 1993.

*Primary Examiner*—Christopher J. Novosad
*Attorney, Agent, or Firm*—Burd, Bartz & Gutenkauf

[57] ABSTRACT

An earthworking wheel for closing a seed trench made by a planter has an annular low friction body having circumferentially spaced outwardly directed teeth. A pair of hubs clamped onto opposite sides of the body accommodate a bearing for rotatably supporting the wheel on an axle.

14 Claims, 5 Drawing Sheets

U.S. PATENT DOCUMENTS

| | | | |
|---|---|---|---|
| 5,443,023 | 8/1995 | Carroll | 111/191 |
| 5,461,995 | 10/1995 | Winterton | 111/139 |
| 5,477,792 | 12/1995 | Bassett et al. | 111/121 |
| 5,497,717 | 3/1996 | Martin | 111/191 |
| 5,497,836 | 3/1996 | Groff | 172/555 |
| 5,517,932 | 5/1996 | Ott et al. | 111/193 |
| 5,628,372 | 5/1997 | Creyke | 172/534 |
| 5,645,000 | 7/1997 | Carroll | 172/540 X |

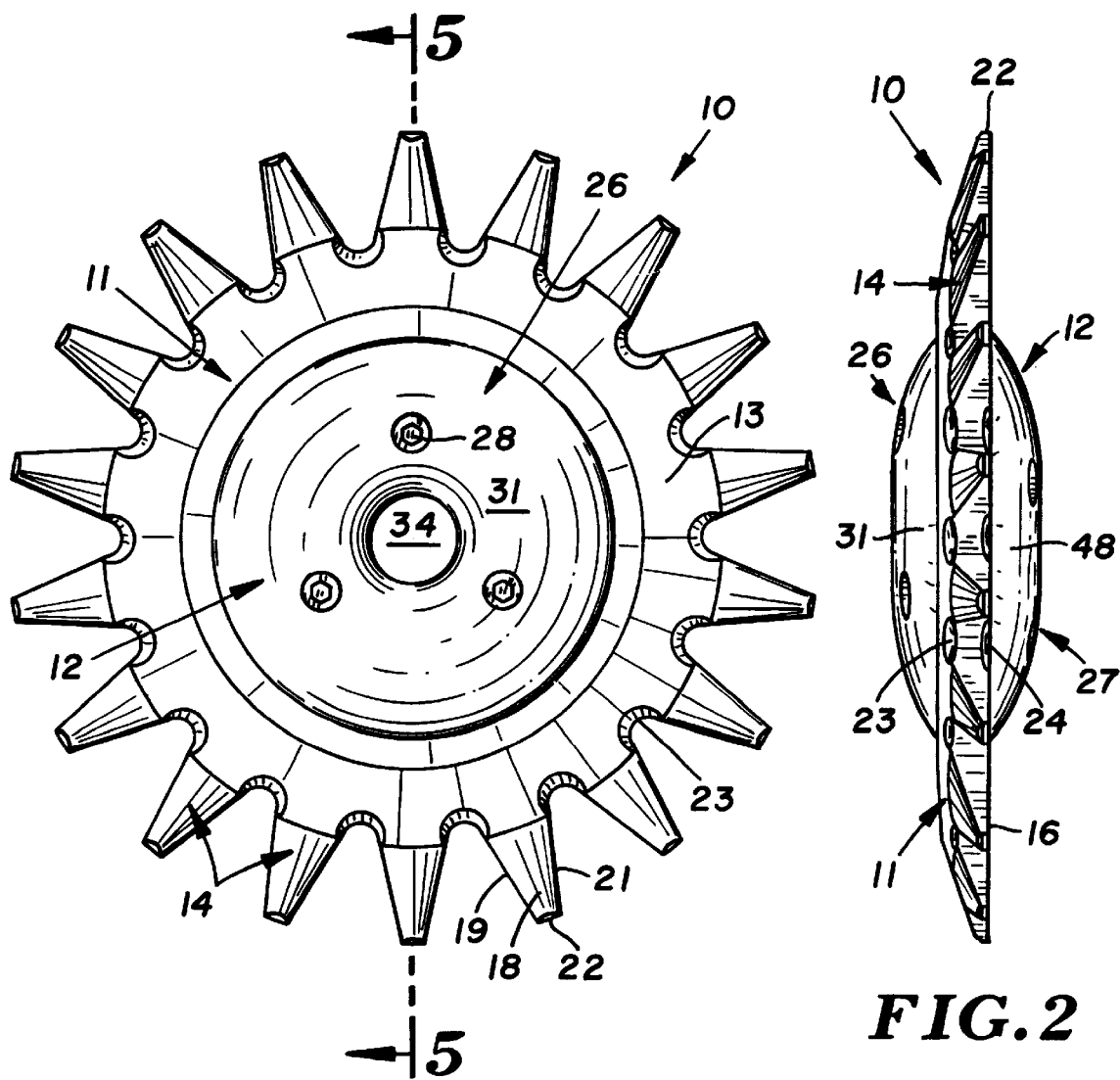
FIG.1
FIG.2
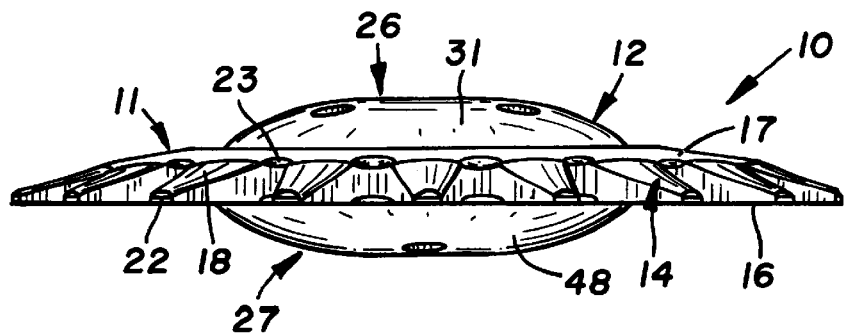
FIG.3

SEED FURROW CLOSING WHEEL

CROSS REFERENCE TO RELATED APPLICATION

This application is a continuation-in-part of U.S. application Ser. No. 29/045,706 filed Oct. 27, 1995, now U.S. Pat. No. D 382,571; application Ser. No. 29/054,077 filed May 6, 1996, now U.S. Pat. No. D 386,191; and application Ser. No. 29/069,044 filed Mar. 18, 1997, now U.S. Pat. No. D 395,662.

FIELD OF THE INVENTION

The invention is in the field of earthworking tools used with seed planters and drills for closing open seed furrows. The earthworking tool is a wheel having outwardly directed fingers operable to close seed furrows produced in soil subjected to notillage, minimum tillage or conventional tillage soil management.

BACKGROUND OF THE INVENTION

Seed furrow closing wheels having teeth have been used to till compacted soil and firm loose soil to improve seed germination and emergence. The teeth have sharp edges that interact with the soil to remove residue from the teeth. The wheels are metal disks. H. Martin in U.S. Pat. No. 5,497,717 discloses seed furrow closing metal wheels having radial teeth for breaking up soil clods and firm loose soil. W. R. Carroll in U.S. Pat. No. 5,443,023 discloses an agricultural planter equipped with a pair of rotary forks for closing an open seed furrow. Each fork has a hub and a plurality of radially projecting rigid tines secured to the hub. The tines have an arcuate configuration in a radial direction. The tines have a convex soil engaging surface which imparts a compression action to the soil adjacent the soil sidewall of the open seed trench to break down the soil sidewall and cover the seed with soil. J. L. Groff in U.S. Pat. No. 5,497,836 discloses a row cleaning finger wheel having a central disc portion and a plurality of fingers. The longitudinal axis of each finger is at an angle with respect to a radius of the wheel. The wheel is a metal disk that can accumulate soil in use.

SUMMARY OF THE INVENTION

The invention is an earthworking wheel adopted to be used with an agricultural seed planter to close open seed furrows and cover the seeds in the furrows with an even layer of soil. The wheel has an annular body of low friction plastic, such as ultra high molecular weight polyethylene, having outwardly directed projections or teeth. The teeth are outward extensions of the body that work the soil as the wheel rotates in the soil. A hub assembly attached to the body accommodates a bearing that rotatably supports the wheel on an axle secured to supports connected to the planter. The hub assembly has two hubs clamped onto the body with fasteners. The hubs can be separated to permit replacement of the body with a new body or a body having different teeth configuration. The body can have a continuous outer peripheral edge without teeth. The entire wheel is relatively narrow which provides flexibility in mounting of different types of planters and drills. The configuration of the teeth and low friction plastic structure reduce dirt, mud, and trash build up on the wheel.

The preferred embodiments of the wheel has an annular body of low friction plastic supported with a pair hubs clamped to opposite sides of the body. Outwardly directed teeth are joined to the body. In one arrangement the teeth have outwardly converging linear side walls and a convex curved front wall. An alternative wheel has inclined or angled teeth attached to the body. The inner portion of the body has annular grooves in opposite sides thereof that accommodate annular first lips on the hubs. The hubs have second annular lips that fit against the inside annular surface of an inner web of the body. The web and hubs have cooperating rib and groove structures that prevent rotation of the body relative to the hubs.

These wheel structures, functions and objects of the invention and additional advantages are included in the following detailed description and drawings of the embodiments of the wheels of the invention.

DESCRIPTION OF THE DRAWINGS

FIG. 1 is a front side elevational view of the earth working wheel of the invention;

FIG. 2 is an end elevation view thereof;

FIG. 3 is a top plan view thereof;

DESCRIPTION OF PREFERRED EMBODIMENTS

Referring to FIGS. 1 to 4, earthworking wheel 10 for use with an agricultural seed planter for covering the seeds placed in the soil with loose soil by chewing off the soil trench wall instead of squeezing the soil walls together. This provides room for plant roots to spread and grow allowing the roots to firmly cooperate with the soil. Wheel 10 has outer surface having low coefficient of friction that eliminates bunching and buildup of soil and debris that increases soil compaction.

Figure 4:
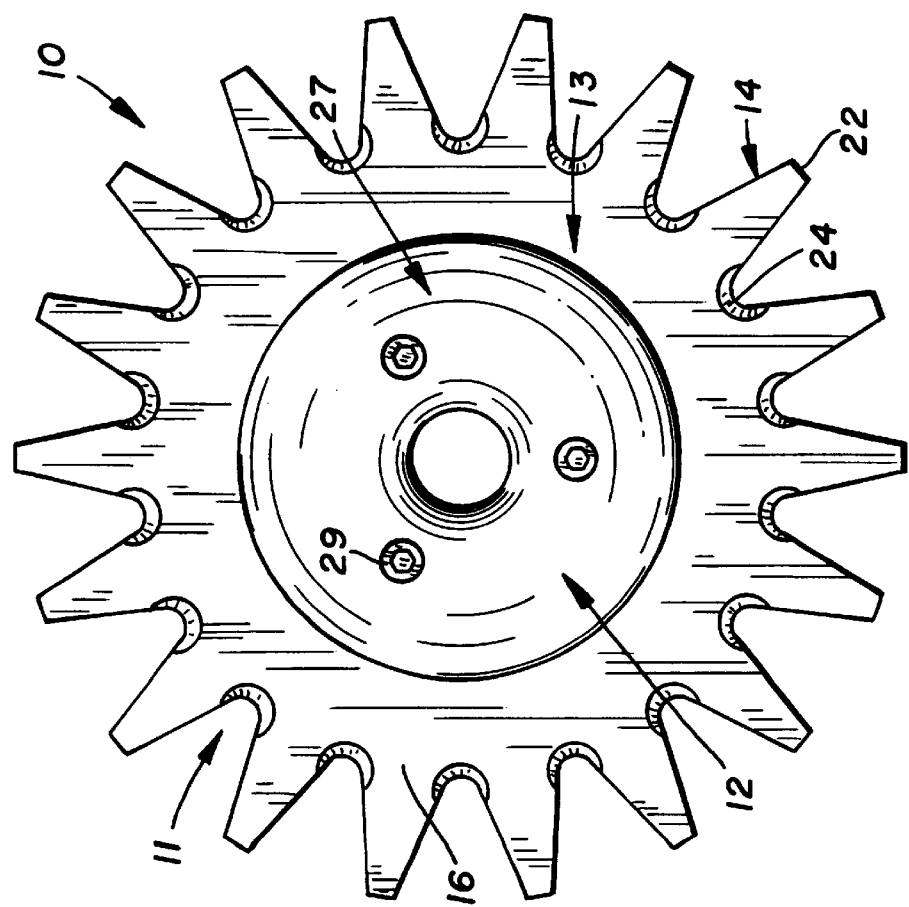
FIG. 4 is a rear side elevational view thereof.
Figure 6:
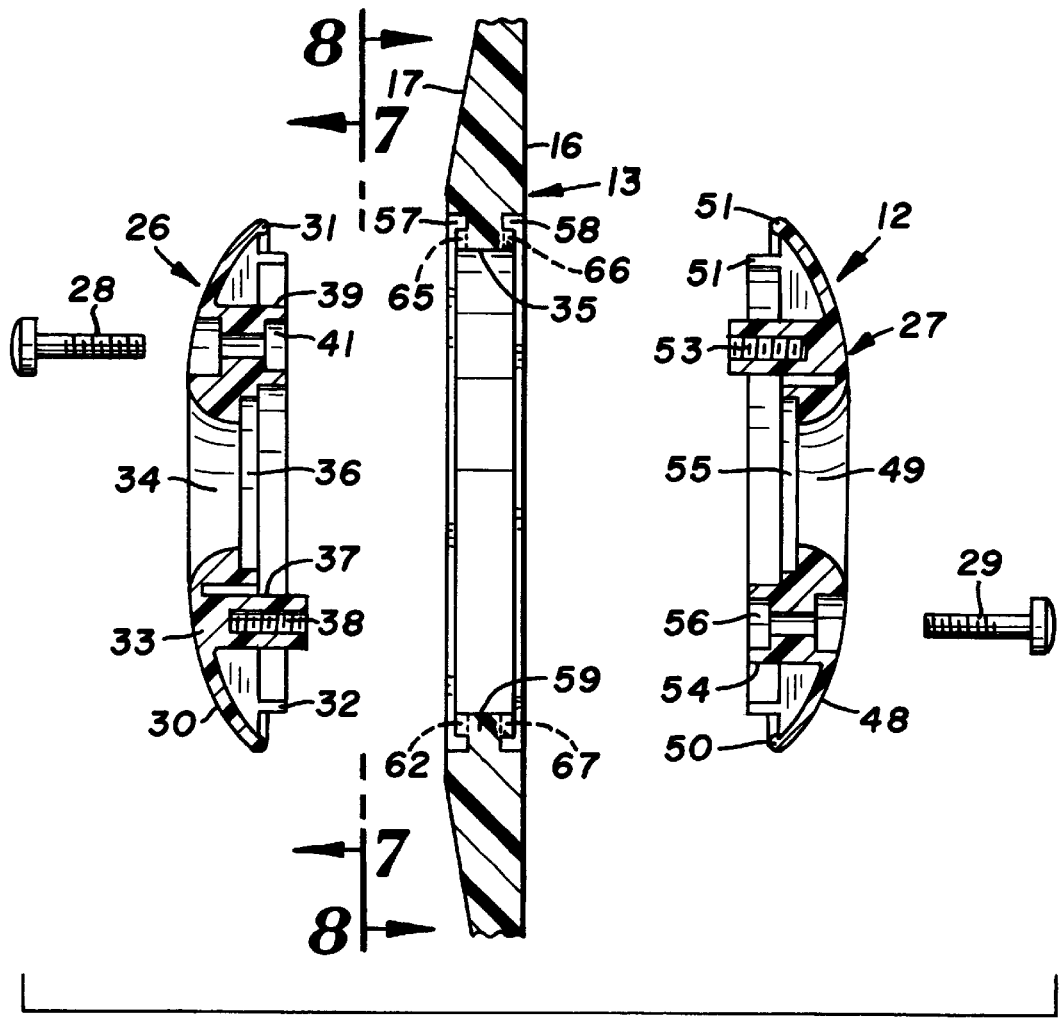
FIG. 6 is an exploded sectional view of FIG. 5.

Earthworking wheel 10 has an annular member or ring 11 mounted on a hub assembly 12. Ring 11 comprises an generally flat annular body 13 and a plurality of outwardly directed projections or teeth 14 circumferentially spaced around body 13. As shown in FIGS. 1 and 4, eighteen teeth 14 project outwardly from body 13. The numbered teeth and diameter of the ring 11 can vary. Each tooth 14 has a generally truncated cone configuration. Body 13 and teeth 14 have a common flat back surface 16 extended outwardly from hub assembly 12. The front surface 17 of body 13 tapers outwardly toward back surface 16 which reduces the thickness of body 13 in the radial outward direction. Each tooth 14 has a convex curve front face 18 and outwardly converging linear side walls 19 and 21. The front face 18 tapers outwardly to a generally flat nose 22. The angle between side walls 19 and 21 is 30 degrees. Other angles can be used. The radial length of each tooth 14 is about the same as the radial width of body 13. Semi-circular recesses 23 and 24 in the root sections of the front and back surfaces of body 13 provide smooth concave shapes between adjacent teeth. Recesses 23 and 24 also eliminate sharp stress regions in body 13 adjacent the bottoms of teeth 14. The body 13 and teeth 14 are a one-piece plastic annular member. The plastic is an ultra high molecular weight polyethylene. The plastic has a low coefficient of friction that resists adhesion of soil to the annular member. The plastic is abrasion and impact resistant.

Figure 5:
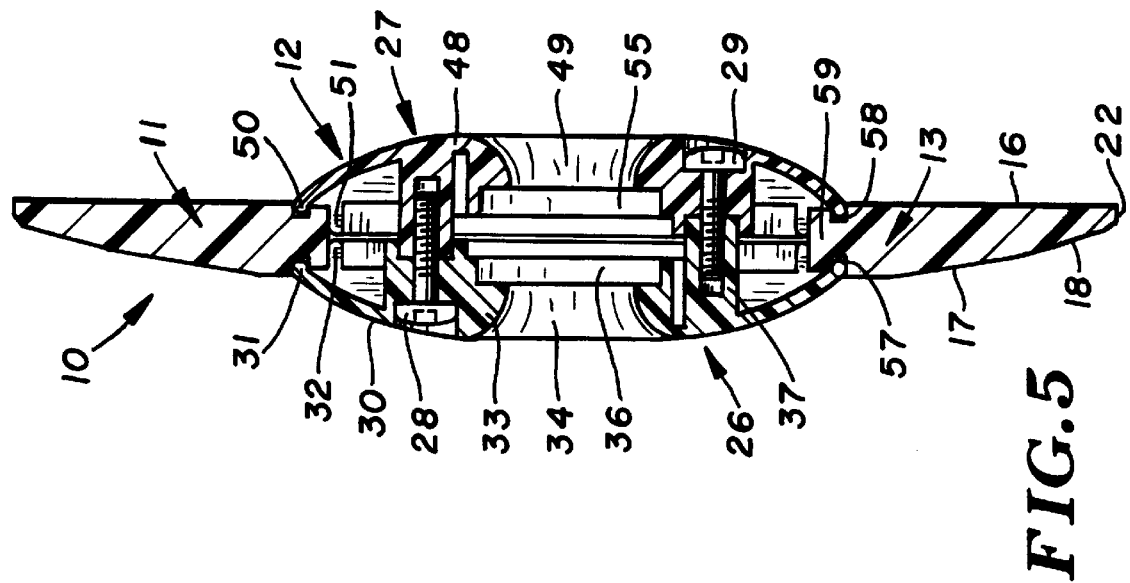
FIG. 5 is a sectional view taken along line 5—5 of FIG. 1.
Figure 7:
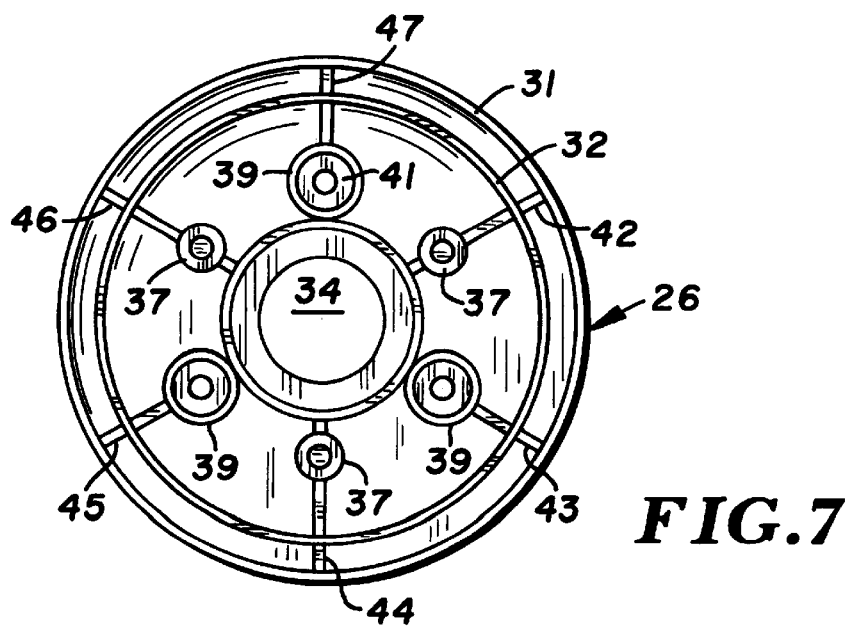
FIG. 7 is an elevational view of the inside of a hub viewing along line 7—7 of FIG. 6.

Hub assembly 12 comprises a pair of hubs 26 and 27 located in locked engagement with opposite sides of body 13. Bolts 28 and 29 clamp hubs 26 and 27 on body 13. As shown in FIG. 1, three bolts 28 located in counter sunk holes in hub 26 secure hub 26 to hub 27. FIG. 4 shows three bolts 29 in counter sunk holes in hub 27 connecting hub 27 to hub 26. Hub 26 has a dome shaped outer surface 30 between an outer peripheral lip 31 and an inner annular body 33 having a center opening or hole 34. Surface curves inwardly toward ring 11 to provide a generally smooth configuration transition between hub 26 and ring 11 to minimize collection of soil and debris on wheel 10. A second inwardly directed flange or lip 32 concentric with lip 31 projects inwardly adjacent the inside annular wall 35 of body 13. Lip 32 engages an annular web 59 having wall 35. As shown in FIG. 7, circumferentially spaced radial ribs 42–47 extend between ribs 31 and 32. As shown in FIG. 5, hub 26 has an inside central recess 36 for accommodating part of bearing. Recess 36 has an annular shape to accommodate the outer circular race of a roller bearing (not shown) used to rotatably mount wheel 10 on an axle. Hub 26 has first bosses 37 with a threaded blind holes 38 accommodating bolts 29. Spaced from first bosses 37 are second bosses 39 with circular pockets 41.

Hub 27 has the same structure as hub 26. The outside surface 48 of hub 27 has a dome shape extended to an inwardly directed first lip 50. The center of surface 48 has an opening 49 and an annular inside recess 55 to retain a bearing. A second lip 51 concentric with lip 50 is located under inside wall 35 of rim 59. A first cylindrical boss 52 has a threaded bore 53 accommodating bolts 28. The inner ends of bosses 53 fits in pockets 41 of hub 26. Second bosses 54 have pockets 56 that accommodate the inner ends of bosses 37 of hub 26.

Figure 8:
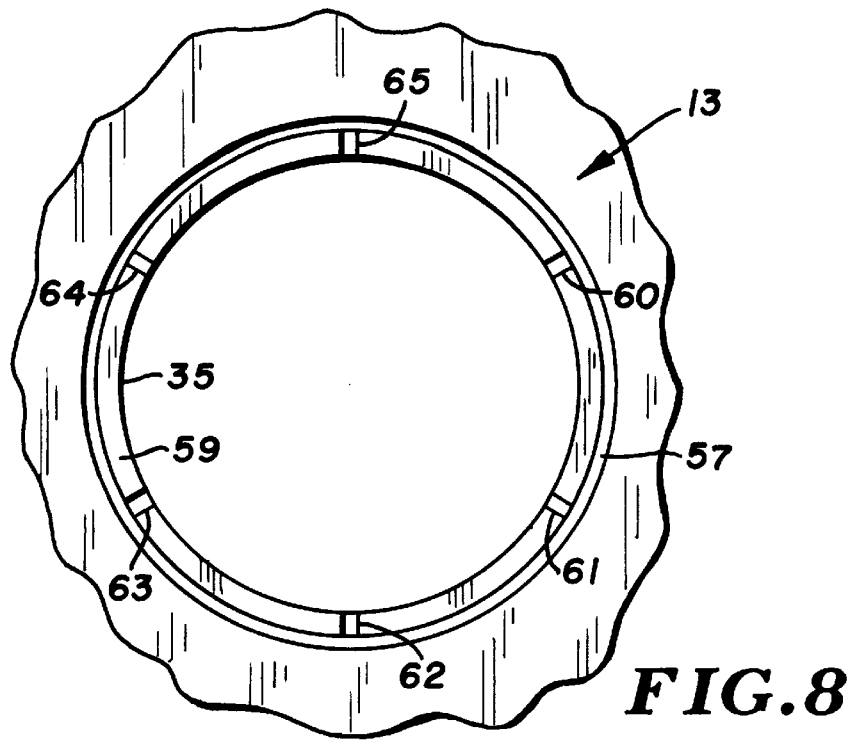
FIG. 8 is an elevational view of annular member of the wheel viewing along line 8—8 of FIG. 6.

Body 13 has a first annular groove 57 in the front side 17 and a second annular groove 58 in the rear side 16. Lip 31 of hub 26 fits in groove 57. Lip 50 of hub 27 fits in groove 58. Second lips 32 and 51 are located in engagement with the inside wall 35 of rim 59. As shown in FIG. 8, the annular rim 59 between groove 57 and inside wall 35 has circumferentially spaced slots 60–65 for accommodating radial ribs 42–47 of hub 26. The rib and slot structures prevent turning of body 13 relative to hub 26. Hub 27 has radial ribs shown in FIG. 7, that fit into slots 66 and 67 in rim 59. The cooperating ribs and slots in hub 27 and body 13 prevent rotation of body 13 relative to hub 27.

Figure 9:
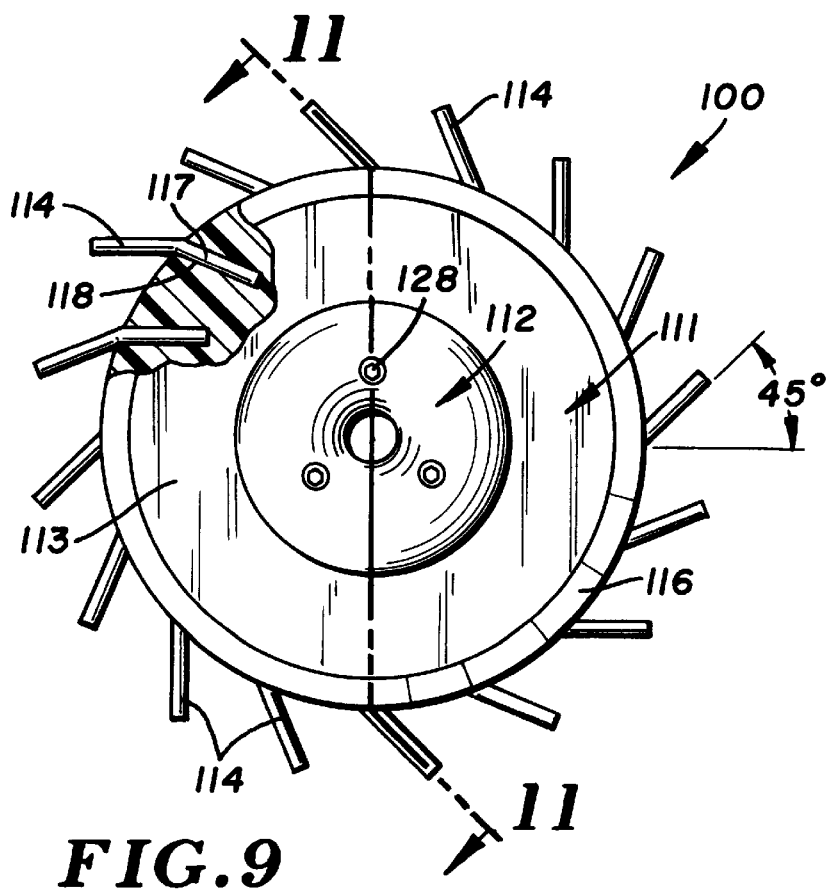
FIG. 9 is a side elevational view , partly sectioned, of a modification of the earthworking wheel of the invention.
Figure 10:
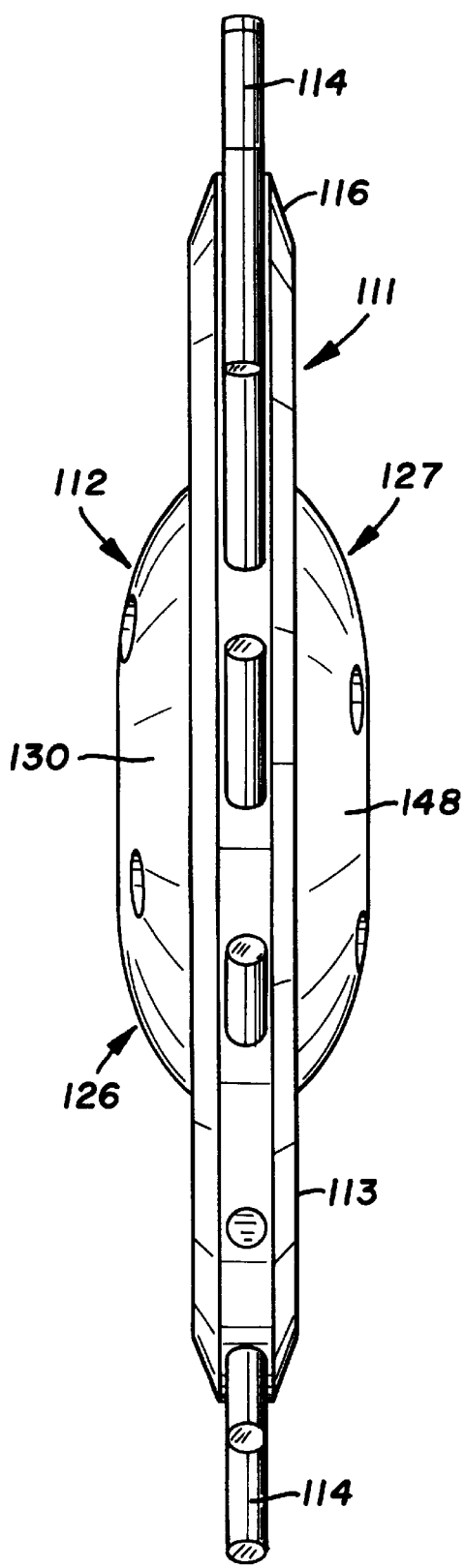
FIG. 10 is an end elevational view of the wheel of FIG. 9.
Figure 11:
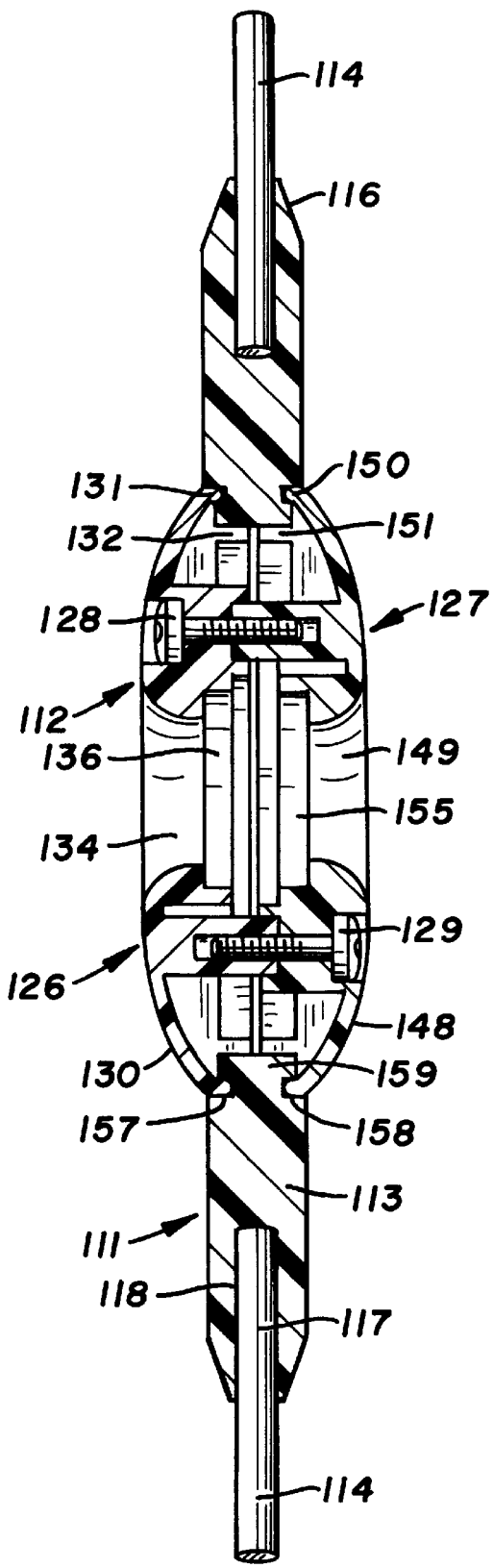
FIG. 11 is a sectional view taken along line 11—11 of FIG. 9.

A modification of the earthworking wheel 100, shown in FIGS. 9, 10, and 11, has a ring or annular member 111 mounted on a hub assembly 112. Ring 111 comprises a flat annular body 113 supporting a plurality of teeth 114. As shown in FIG. 9, sixteen teeth 114 are circumferentially spaced around body 113. The number and length of the teeth can be altered. Body 113 is an annular plastic member that has a low coefficient of friction to resist collection of soil and is abrasion and impact resistant. An example of the plastic is ultra high molecular weight polyethylene.

Each tooth 114 is a cylindrical rod that extends outwardly from the outer beveled-edge 116 of body 113 at an angle relative to a radial line intersecting the tooth. The angle between the radial line and the tooth 114 is 45 degrees. Other angles can be used for the linear teeth 114 projecting from body 114. As shown in FIGS. 9 and 11, each tooth 114 has an inner end 117 located in a bore 118 in body 113. End 117 is secured to body 113. Bore 118 is at an angle of about 30 degrees relative to a radial line intersecting the bore. Other angles for bore 118 can be used. Teeth 113 are metal rods or spikes anchored in body 113. Rigid plastic rods can be used for teeth 114.

Hub assembly 112 is identical to hub assembly 12. The parts of hub assembly 112 that correspond with the parts of hub assembly 12 have the same reference numbers with the prefix 1. The lips 131 and 150 on hubs 126 and 127 extend into annular grooves 157 and 158 in opposite sides of body 113. Second lips 132 and 151 on hubs 126 and 127 extend under and engage the inner rim 159 of body 113. Bolts 128 and 129 clamp hubs 126 and 127 on body 113. Hubs 126 and 127 and rib 159 have the same cooperating rib and slot structures as shown by ribs 42–47 and slots 60–65 in FIGS. 7 and 8 to prevent rotation of body 113 relative to hubs 126 and 127. The centers of hubs 126 and 127 are open to accommodate an axle and bearing for rotatably mounting the hub assembly on the axle. The bearing fits in recesses 136 and 155 in hubs 126 and 127.

There have been shown and described preferred embodiments of the earthworking wheel. Changes, modifications and alterations of the structure, arrangement of structure, and materials can be made by a person skilled in the art without departing from the invention.

We claim:

1. A wheel for working soil comprising:
an annular body having first and second sides and a plurality of outward directed teeth, said teeth being spaced from each other around an outer peripheral section of the body, a first member located adjacent the first side of the body, a second member located adjacent the second side of the body, said body having a first groove in the first side and a second groove in the second side said, first member having a first lip located in the first groove, said second member having a second lip located in the second groove, slots in the body ribs in the first and second members cooperating with the slots to prevent rotation of the body relative to the first and second members, the first and second members having means for supporting a bearing to allow rotation of the wheel, and means for securing the first and second members to each other and holding the first and second members in engagement with the body.

2. The wheel of claim 1 wherein: the first and second members each have a convex outer surface.

3. The wheel of claim 2 wherein: the first and second members each have diameters smaller than the outer peripheral section of the body.

4. The wheel of claim 1 wherein: the body is an annular plastic ring.

5. The wheel of claim 1 wherein: the first and second grooves are each annular grooves, and said first and second lips are annular lips that fit in the annular grooves.

6. The wheel of claim 1 wherein: the body is an annular plastic ring, said first and second members are each convex metal hubs.

7. The wheel of claim 1 wherein: each tooth projects outwardly at an angle relative to a radial line of said body intersecting the tooth.

8. The wheel of claim 7 wherein: the angle is about 45 degrees.

9. The wheel of claim 7 wherein: each tooth is a cylindrical member.

10. A wheel for working soil comprising:

a body of low friction plastic having first and second sides an outer peripheral section, and a plurality of outward directed teeth, said teeth being spaced from each other around the outer peripheral section of the body, a first hub located adjacent the first side of the body, a second hub located adjacent the second side of the body, said first and second hubs having lips, said body having grooves cooperating with the lips, means cooperating with the body and first and second hubs to prevent rotation of the body relative to the first and second hubs, and means for securing the first and second hubs to each other and holding the first and second hubs in engagement with the body.

11. The wheel of claim 10 wherein: the first and second hubs each have a convex outer face.

12. The wheel of claim 10 wherein: each tooth projects outwardly at an angle relative to a radial line of said body intersecting the tooth.

13. The wheel of claim 10 wherein: each tooth is a cylindrical member.

14. The wheel of claim 10 wherein: the means cooperating with the body and first and second hubs comprise slots in the body and ribs in the first and second hubs to prevent rotation of the body relative to the first and second hubs.

* * * * *